(12) United States Patent
Devore et al.

(10) Patent No.: US 8,449,254 B2
(45) Date of Patent: May 28, 2013

(54) BRANCHED AIRFOIL CORE COOLING ARRANGEMENT

(75) Inventors: Matthew A. Devore, Cromwell, CT (US); Eleanor D. Kaufman, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 561 days.

(21) Appl. No.: 12/748,501

(22) Filed: Mar. 29, 2010

(65) Prior Publication Data

US 2011/0236178 A1 Sep. 29, 2011

(51) Int. Cl.
*F01D 5/18* (2006.01)

(52) U.S. Cl.
USPC .............................. 416/1; 415/115; 416/97 R

(58) Field of Classification Search
USPC ............. 145/115, 116; 416/90 R, 96 R, 97 R, 416/1; 415/115, 116
See application file for complete search history.

(56) References Cited

U.S. PATENT DOCUMENTS

| 5,720,431 | A | 2/1998 | Sellers et al. |
| 5,813,835 | A | 9/1998 | Corsmeier et al. |
| 6,168,381 | B1 | 1/2001 | Reddy |
| 6,247,896 | B1 | 6/2001 | Auxier et al. |
| 6,705,836 | B2 | 3/2004 | Bourriaud et al. |
| 6,916,150 | B2 * | 7/2005 | Liang ............................ 415/115 |
| 7,137,776 | B2 | 11/2006 | Draper et al. |
| 7,273,351 | B2 * | 9/2007 | Kopmels ..................... 416/97 R |
| 7,296,972 | B2 | 11/2007 | Liang |
| 7,296,973 | B2 | 11/2007 | Lee et al. |
| 7,334,991 | B2 | 2/2008 | Liang |
| 7,364,405 | B2 * | 4/2008 | Cunha et al. ................. 416/97 R |
| 7,407,365 | B2 * | 8/2008 | Dodd ............................ 415/115 |
| 7,513,744 | B2 | 4/2009 | Cunha et al. |
| 7,665,956 | B2 * | 2/2010 | Mitchell et al. ............... 415/115 |
| 7,717,675 | B1 * | 5/2010 | Liang .............................. 416/95 |
| 7,789,625 | B2 * | 9/2010 | Liang .......................... 416/97 R |
| 8,182,224 | B1 * | 5/2012 | Liang .......................... 416/97 A |
| 2011/0132562 | A1 * | 6/2011 | Merrill et al. ..................... 164/9 |
| 2011/0143162 | A1 * | 6/2011 | Merrill et al. ................. 428/603 |

FOREIGN PATENT DOCUMENTS

JP 62-135603 A * 6/1987

OTHER PUBLICATIONS

Tsuneo, Moving Blade of Gas Turbine, Jun. 18, 1987, Abstract of JP62-135603.*

* cited by examiner

*Primary Examiner* — Edward Look
*Assistant Examiner* — Liam McDowell
(74) *Attorney, Agent, or Firm* — Carlson, Gaskey & Olds PC

(57) ABSTRACT

An example airfoil cooling arrangement includes a airfoil wall having a first face and a second face opposite the first face. The airfoil wall establishes a channel that is configured to communicate fluid between an inlet aperture and an outlet aperture. The channel includes secondary portion that branch from a primary portion. An example airfoil cooling method includes receiving a flow of fluid from a airfoil core cavity and communicating the flow of fluid through channel within a wall of the airfoil. The channel has a secondary portion branching from a primary portion.

27 Claims, 6 Drawing Sheets ly illustrates an example turbofan gas
BRANCHED AIRFOIL CORE COOLING ARRANGEMENT

BACKGROUND

This disclosure relates generally to cooling gas turbine engine airfoils. More particularly, this disclosure relates to communicating air through a branched channel within a wall of the airfoil to cool the airfoil.

Gas turbine engines are known and typically include multiple sections, such as a fan section, a compression section, a combustor section, a turbine section, and an exhaust nozzle section. The compressor and turbine sections include blade arrays mounted for rotation about an engine axis. Between blades, vanes exist to guide flow. The blade and vane arrays include multiple individual airfoils that extend radially from a mounting platform to a tip on blades, and to another platform on vanes. As known, airfoils are exposed to extreme temperatures within the engine.

Fluid, such as air, is often used to remove thermal byproducts from the engine, including the airfoils. For example, some airfoils communicate air through film cooling holes in the walls of the airfoils to cool the airfoils. The cooling air moves from cavities in the core of the airfoil core through the film cooling holes. Some airfoils include impingement holes configured to communicate air toward a particular area of the airfoils.

SUMMARY

An example airfoil cooling arrangement includes a blade wall having a first face and a second face opposite the first face. The blade wall establishes a channel that is configured to communicate fluid between an inlet aperture and an outlet aperture. The channel includes secondary portion that branches from a primary portion.

An example airfoil casting mold insert includes an insert that establishes a cooling channel within a blade during casting of the blade wall. The insert has at least one first end and at least one second end. Each first end is configured to establish respective inlet apertures. Each second end is configured to establish respective outlet apertures. The channel includes secondary portions that branch from a primary portion.

An example airfoil cooling method includes receiving a flow of fluid from a blade core cavity and communicating the flow of fluid through channel within a wall of the blade. The channel has a secondary portion branching from a primary portion.

These and other features of the disclosed examples can be best understood from the following specification and drawings, the following of which is a brief description:

DETAILED DESCRIPTION

Figure 1:
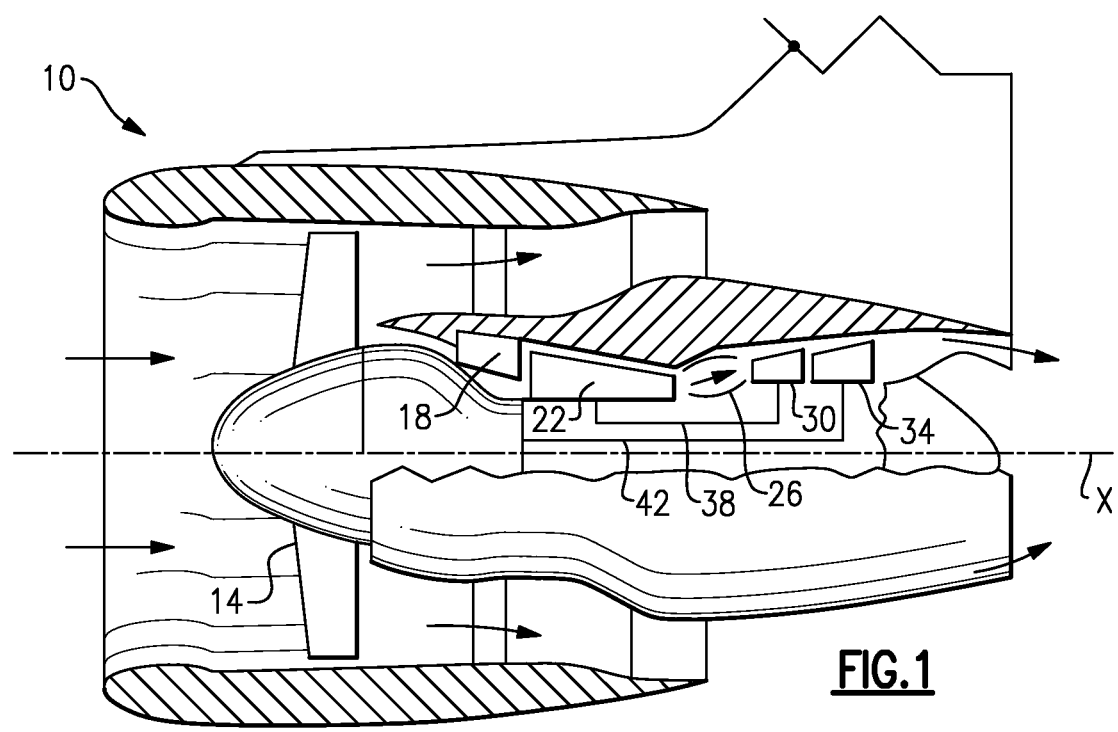
FIG. 1 shows a partial schematic view of an example gas turbine engine.

FIG. 1 schematically illustrates an example turbofan gas turbine engine 10 of an aircraft 12. The gas turbine engine 10 includes (in serial flow communication) a fan section 14, a low-pressure compressor 18, a high-pressure compressor 22, a combustor 26, a high-pressure turbine 30, and a low-pressure turbine 34. The gas turbine engine 10 is circumferentially disposed about an engine centerline X.

During operation, air A is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26. The residual energy is then expanded through the nozzle section to produce thrust.

In a two-spool design, the high-pressure turbine 30 utilizes the extracted energy from the hot combustion gases to power the high-pressure compressor 22 through a high speed shaft 38, and the low-pressure turbine 34 utilizes the extracted energy from the hot combustion gases to power the low-pressure compressor 18 and the fan section 14 through a low speed shaft 42.

The examples described in this disclosure are not limited to the two-spool engine architecture described, however, and may be used in other architectures, such as a single-spool axial design, a three-spool axial design and a three spool axial and centrifugal design, and still other architectures.

Figure 2:
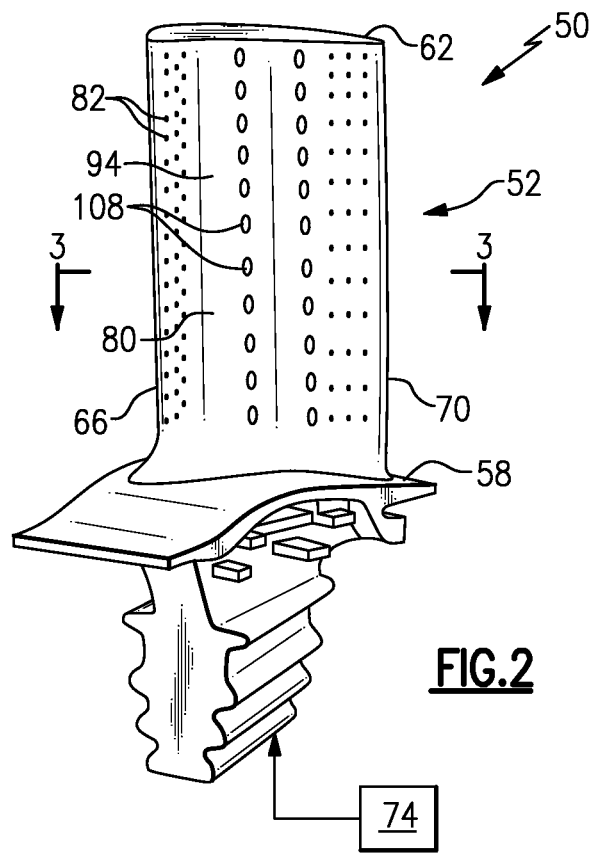
FIG. 2 shows an example airfoil from the turbine section of the FIG. 1 engine.
Figure 3:
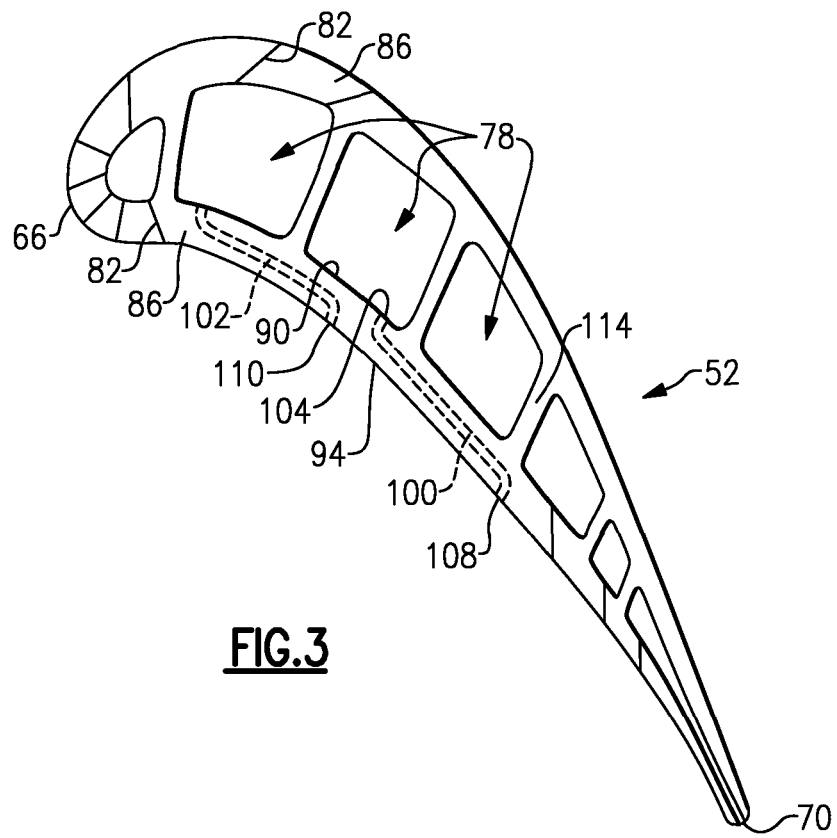
FIG. 3 shows a section view through line 3-3 of FIG. 2.

Referring to FIGS. 2 and 3 with continuing reference to FIG. 1, the high pressure turbine 30 includes a blade 50 having an airfoil 52 extending from a blade base 58 to a blade tip 62. The airfoil 52 extends radially outward from the axis X of the engine 10 and includes a leading edge 66 and a trailing edge 70.

In this example, cooling air moves from an air supply through blade core cavities 78 within the airfoil 52. The cooling air then moves through film cooling holes 82 established within an outer wall 86 of the airfoil 52.

The outer wall 86 of the example airfoil 52 establishes a channel 100. The channel 100 extends between an inlet aperture 104 and an outlet aperture 108. In this example, the inlet aperture 104 is defined within an inner face 90 of the outer wall 86, and the outlet aperture 108 is defined within an outer face 94 of the outer wall 86. The inner face 90 is opposite the outer face 94. The channel 100 is considered a branching microcircuit cooling array in one example.

Figure 4A:
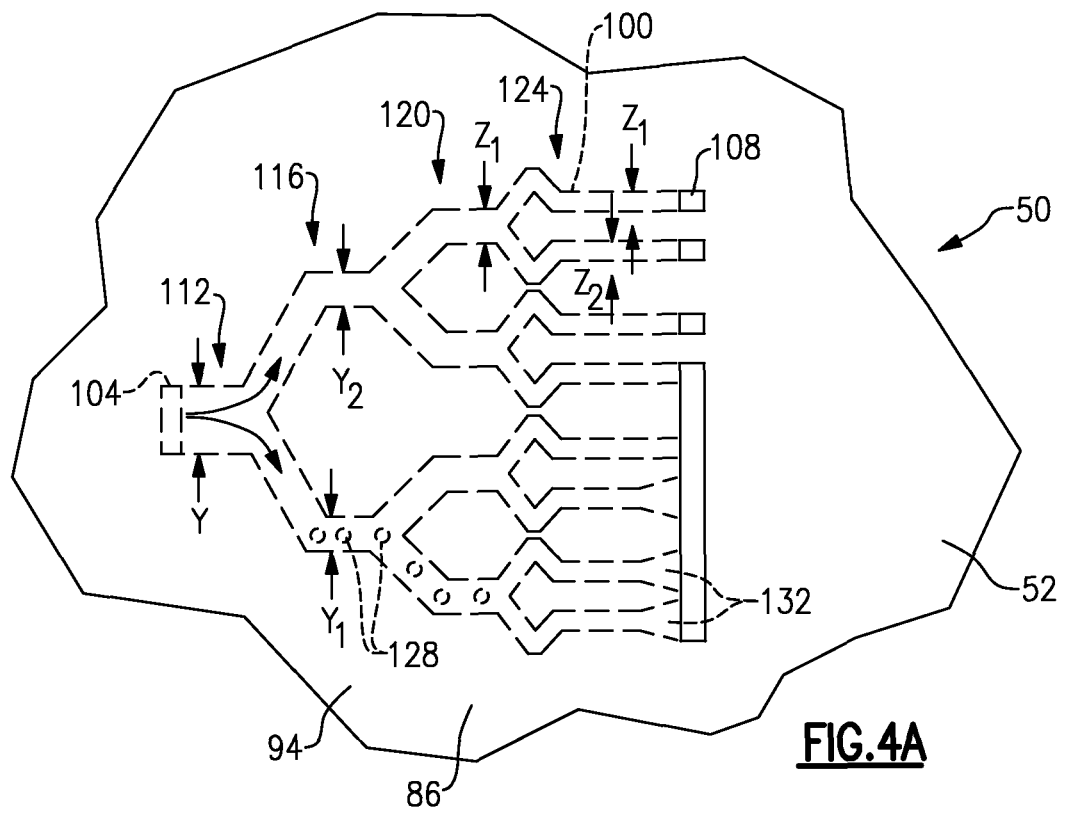
FIG. 4A shows an example channel within a wall of the FIG. 2 airfoil.

Referring now to FIG. 4A with continued reference to FIGS. 2 and 3, the channel 100, in this example, includes a primary portion 112, secondary portions 116, tertiary portions 120, and quartary portions 124. The secondary portions 116 branch from the primary portion 112. The tertiary portions 120 branch from the secondary portions 116. The quartary portions 124 branch from the tertiary portions 120.

Air moves through the inlet aperture 104 of the inner face 90 and enters the primary portion 112 of the channel 100. The air then moves through the secondary portion 116, of the channel, the tertiary portion 120 and the quartary portion 124. The cooling airflow exits the channel 100 at the outlet aperture 108 and flows over the outer face 94 of the airfoil 52. The moving air removes thermal energy from the outer wall 86. In this example, outlet apertures associated with some of the quartary portion 124 merge to form the outlet aperture 108. Another area of the quartary portion 124 includes individual outlet apertures.

In this example a plurality of flow augmentation features 128 are disposed within the channel 100. The flow augmentation features 128 increase the surface area of the outer wall 86 exposed to the air within the channel 100. The flow augmentation features 128 facilitate removing thermal energy from the outer wall 86. Other example flow augmentation features 128 include pin fins, trip strips, bulges, and dimples.

In this example, the primary portion 112 of the channel 100 has a cross-sectional area Y that is about the same as the sum of the cross-sectional areas $Y_1$ and $Y_2$ of the secondary portions 116 branching from the primary portion 112. That is, $Y=Y_1+Y_2$. Accordingly, even though the channel 100 branches from the primary portion 112 to the secondary portions 116, the relative cross-sectional area of the channel 100 is maintained, which facilitates a smooth flow of cooling fluid through the channel 100 and relatively uniform distribution of air through the outlet aperture 108. The cross-sectional areas Y, $Y_1$, and $Y_2$ are generally taken perpendicularly relative to the direction of flow through the channel.

The example tertiary portions 120 have a cross-sectional area Z that is about the same as the sum of the cross-sectional areas $Z_1$ and $Z_2$ of the associated one of the quartary portions 124. That is, $Z=Z_1+Z_2$. Other examples include a cross-sectional area Z that varies in size from the cross-sectional areas $Z_1$ and $Z_2$.

In this example, some of the quartary portions 124 include diffused areas 132 near the outlet aperture 108. The diffused areas 132 are an area of the quartary portions 124 that has a greater diameter (or greater cross-sectional area) than other areas of the quartary portions 124. Essentially, the quartary portions 124 are flared near the outlet aperture 108 to provide the diffusion areas 132. The diffusion areas 132 facilitate a smooth transition of the cooling airflow from the channel 100 through the outlet aperture 108. In this example, the diffusion areas 132 of the outlet aperture 108 are each about 35% larger than other portions of the outlet aperture 108. In some examples, the diffusion areas 132 increase the film cooling coverage zone.

Figure 4C:
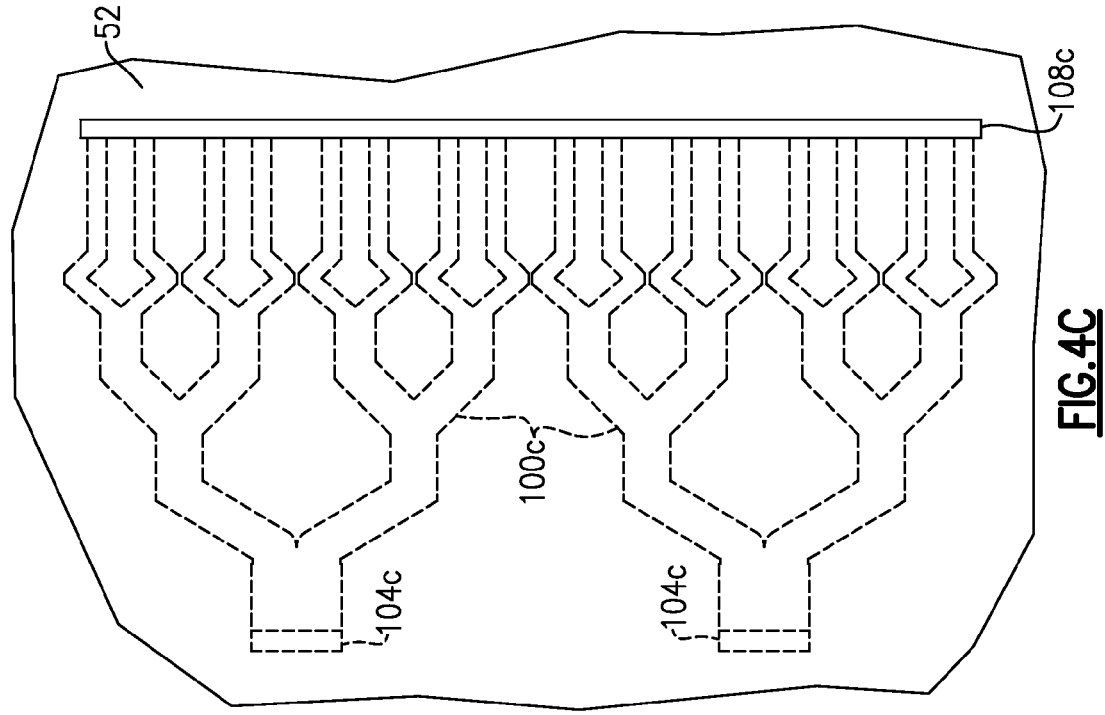
FIG. 4C shows yet another example channel of the FIG. 2 airfoil.
Figure 4B:
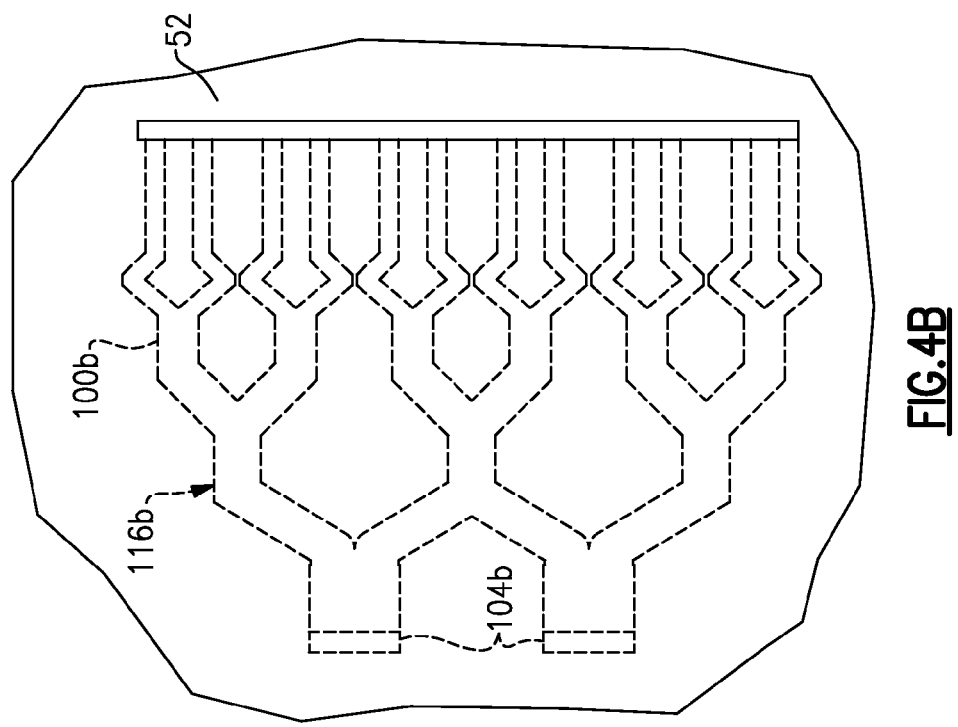
FIG. 4B shows another example channel of the FIG. 2 airfoil.

FIG. 4B shows an example channel 100b having a multiple of inlet apertures 104b and secondary portions 116b that merge.

The example of FIG. 4C shows multiple channels 100c each having an inlet aperture 104c. The channels 100c are configured to communicate air to a single outlet 108c.

Figure 4E:
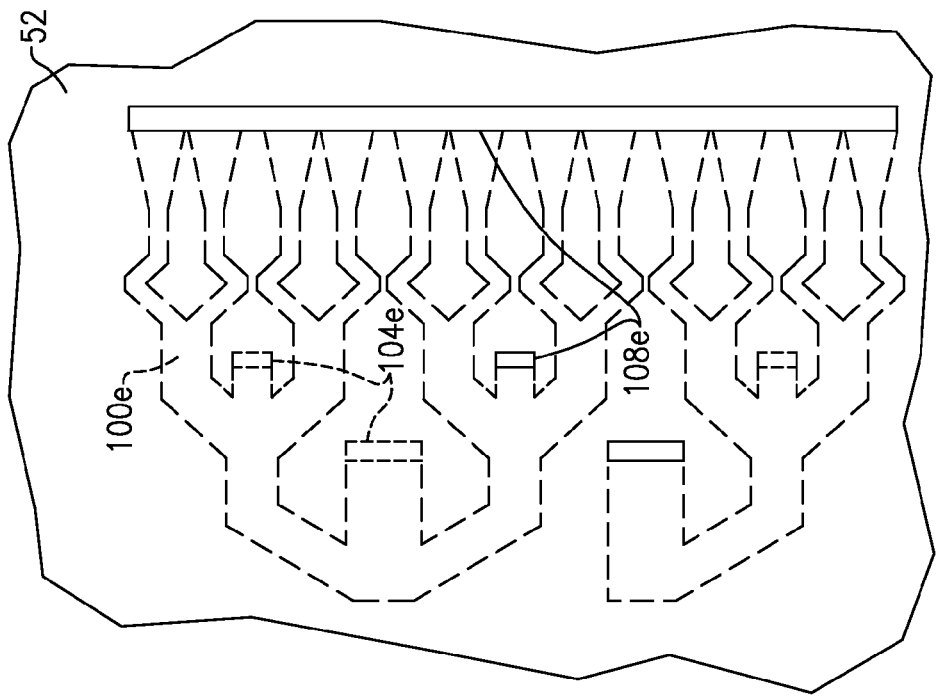
FIG. 4E shows yet another example channel of the FIG. 2 airfoil.
Figure 4D:
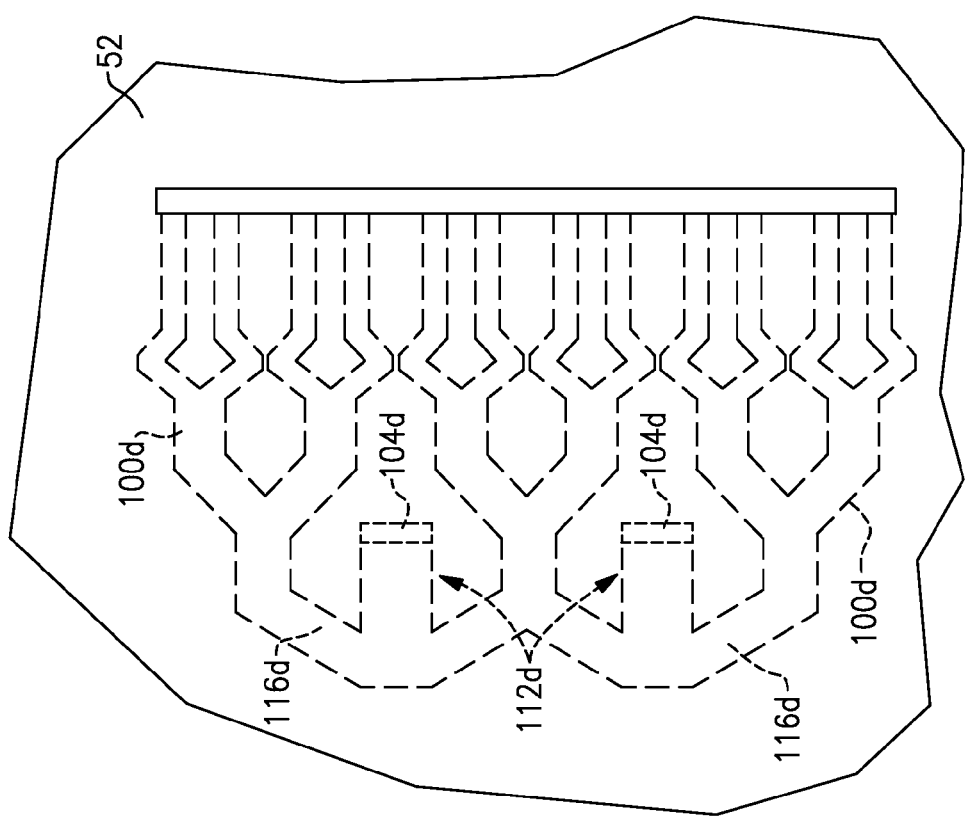
FIG. 4D shows yet another example channel of the FIG. 2 airfoil.

FIG. 4D shows an example channel 100d having multiple inlet apertures 104d. The channels 100d include primary portions 112d configured to direct air toward the leading edge 66 of the airfoil 52. The secondary portions 116d direct the air back toward the trailing edge 70 of the airfoil 52. Thus, in this example, some portions of the channels 100d are closer to the leading edge 66 of the airfoil 52 than the inlet apertures 104d. In another example, the channel 100d directs flow toward the leading edge along its entire length.

The example channel 100e of FIG. 4E includes a multiple of inlet apertures 104e and a multiple of outlet apertures 108e that are positioned in various areas of the airfoil 52. The inlet apertures 104e and outlet apertures 108e are positioned to facilitate thermal energy removal from the airfoil 52, for example.

Figure 4G:
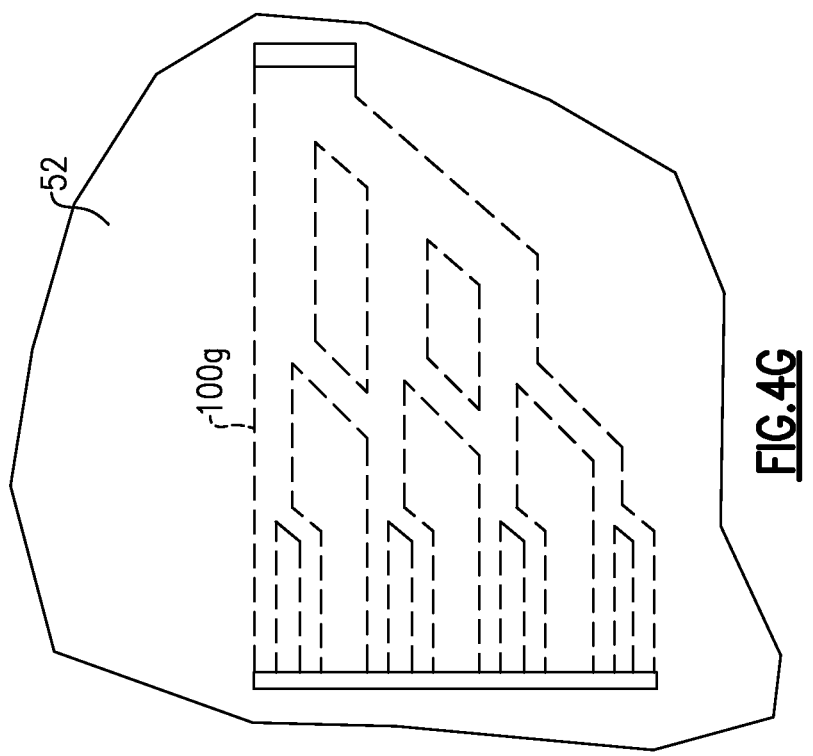
FIG. 4G shows yet another example channel of the FIG. 2 airfoil.
Figure 4F:
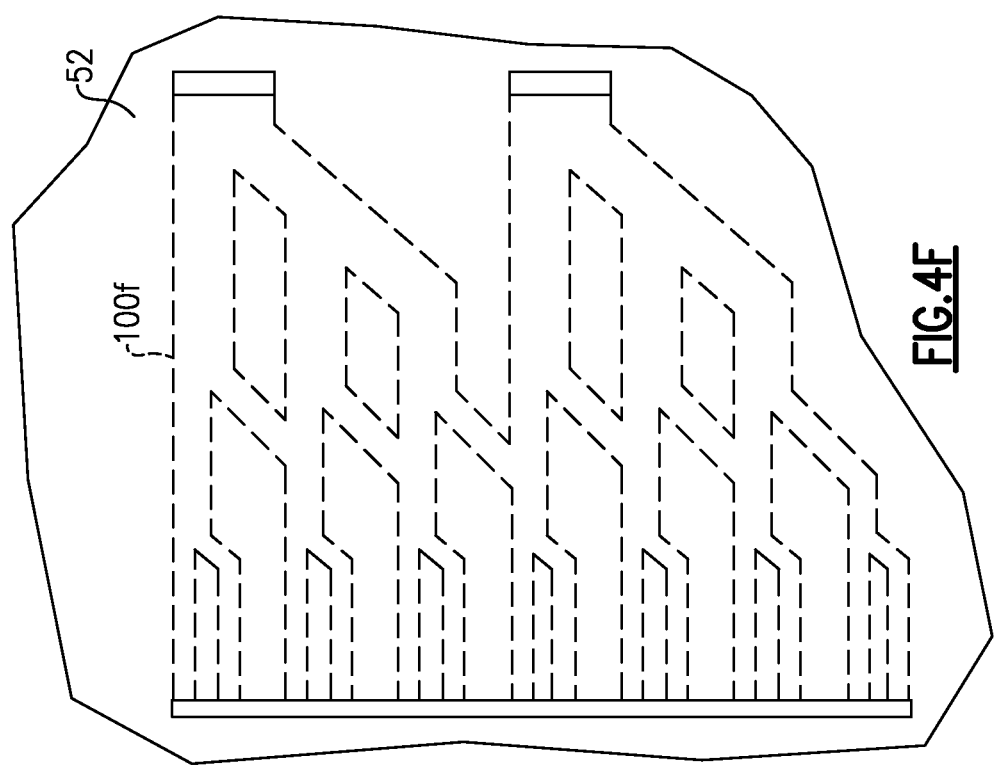
FIG. 4F shows yet another example channel of the FIG. 2 airfoil.

FIGS. 4F and 4G show channels 100f and 100g that are configured to direct air away from the tip 62 of the airfoil 52. Such channels 100f and 100g counteract pumping of air toward the tip 62 during rotation of the airfoil 52. In another example, the channels 100f and 100g are configured to direct air toward the tip.

As can be appreciated from the Figures, many configurations are possible for the channel 100. Specific configurations can be established to remove thermal energy from certain areas of the airfoil 52.

Figure 5:
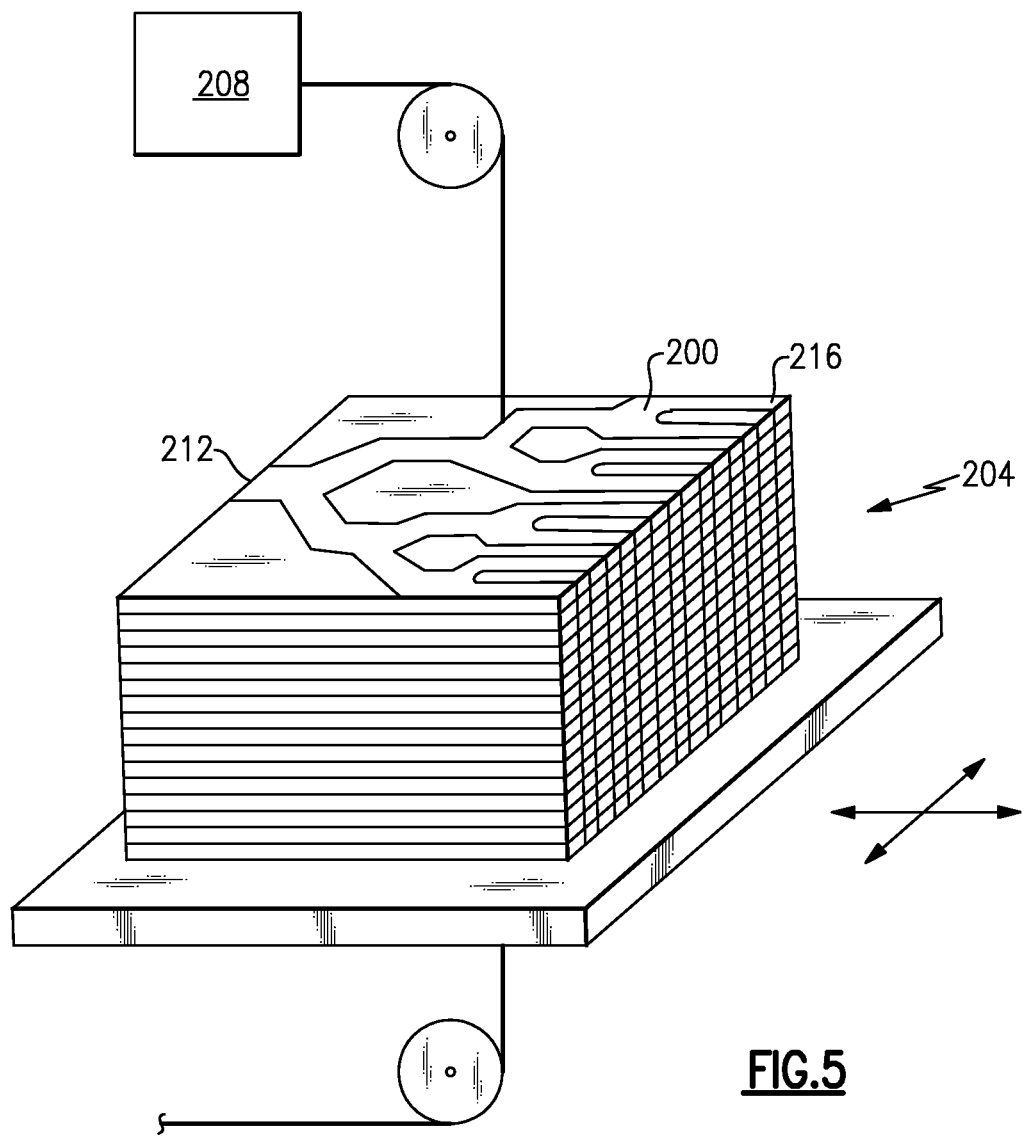
FIG. 5 shows a step in the manufacturing of a casting core mold insert that forms the FIG. 4A channel.

Referring now to FIG. 5 with continuing reference to FIGS. 2 and 3, forming an example casting core insert 200 includes cutting the insert 200 from a stack of metal coupons 204. A wire electric discharge machine 208 is used to cut the insert 200 in this example.

Once cut, the insert 200 can be loaded within a mold utilized for investment casting the blade 50. The liquid blade material flows around the insert 200 within the mold. The insert 200 is typically a refractory metal that maintains shape as the liquid blade material hardens. The refractory metal is leached out leaving a channel 100 within the outer wall 86.

In this example, the insert 200 is bent and sized after being cut from the metal coupons 204. An end portion 212 of the insert 200 is bent to form the inlet aperture 104, and another end portion 216 is bent to form the outlet aperture 108. The end portion 212 is then adhered to a ceramic blade core insert to form the inlet aperture 104. The ceramic blade core insert forms the example blade core cavities 78 in this example.

In this example, the inlet aperture 104 and the outlet aperture 108 are have a rectangular cross-section. Other cross-sections, such as circular cross-sections, are possible. Further, although the example airfoil 52 defines the inlet aperture 104 within the inner face 90 and the outlet aperture 108 within the outer face 94, other examples may define both the inlet aperture 104 and the outlet aperture 108 within the inner face 90. For example, the inlet aperture 104 and the outlet aperture 108 could interface with different blade core cavities 78. Yet another example defines some outlet apertures within the outer face 94 and some outlet apertures within the inner face 90.

The outer wall 86 of the example blade includes a second channel 102. Notably, the inlet aperture 104 of the channels 100 is adjacent an outlet aperture 110 of the second channel 102. In this configuration, positioning the channels 100 and 102 facilitates evenly removing thermal energy from the outer wall 86

In this example, the channels 100 and 102 are positioned in the outer wall 86 of the airfoil 52. In another example, one or both of the channels 100 are positioned in an interior wall 114 of the airfoil 52.

Features of the disclosed examples include branching portions of a channel to increase the distance air must travel through the channel to reach an outlet location and to increase the surface area of the airfoil exposed to a cooling flow of air. Another feature is limiting the number of inlets to the channel, which, in some examples, facilitates control over the air entering the channel, controls pressure burn near the inlet, and simplifies fabrication.

Still other features include reducing flow separation and controlling the pressure drop through the airfoil. The ability to maintain a relatively consistent mass flow of air per unit of area provides a design less sensitive to core tolerances. The channel design, such as the width and area of the channel, can be adjusted to modulate internal heat transfer. For example, positioning the inlet aperture of the channels adjacent an outlet aperture of the another channel facilitates balancing the heat removal due to film cooling and convection. Further, the branching of the channels increases core flexibility in some examples. This increased flexibility has the benefit of reducing main body core connection stresses (thus reduces core breakage) and mitigates positioning difficulty in casting assemblies.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

We claim:

1. An airfoil cooling arrangement, comprising:
an airfoil wall having a first face and a second face opposite the first face, the airfoil wall establishing a channel configured to communicate fluid between at least one inlet aperture and at least one outlet aperture, wherein the channel comprises a multiple of secondary portions branching from a primary portion, the secondary portions each extending along a non-linear path and wherein each of the secondary portions has a smaller cross-sectional area than the primary portion of the channel.

2. The airfoil cooling arrangement of claim 1, wherein the secondary portions have a total cross-sectional area that is about the same as a cross-sectional area of the primary portion.

3. The airfoil cooling arrangement of claim 1, wherein the secondary portions are downstream of the primary portions relative to a direction of fluid flow through the channel.

4. The airfoil cooling arrangement of claim 1, wherein the channel comprises a multiple of tertiary portions, some of the tertiary portions branching from one of the secondary portions and some of the tertiary portions branching from another one of the secondary portions.

5. The airfoil cooling arrangement of claim 4, wherein the channel comprises a multiple of quartary portions, some of the quartary portions branching from one of the tertiary portions and some of the quartary portions branching from another one of the tertiary portions.

6. The airfoil cooling arrangement of claim 1, wherein at least one of the secondary portions merges with a secondary portion of another channel established within the airfoil wall.

7. The airfoil cooling arrangement of claim 1, wherein a portion of the channel is configured to communicate fluid toward a leading edge of the airfoil and another portion of the channel is configured to communicate fluid toward a trailing edge of the airfoil.

8. The airfoil cooling arrangement of claim 1, wherein a portion of the channel terminating at the at least one outlet aperture includes a diffused area.

9. The airfoil cooling arrangement of claim 1, wherein at least one inlet aperture is established within the first face and the at least one outlet aperture is established in the first face, the second face, or both.

10. The airfoil cooling arrangement of claim 1, including a flow augmentation feature disposed within the channel and configured to turbulate flow through the channel.

11. The airfoil cooling arrangement of claim 1, wherein the airfoil wall establishes a second channel configured to communicate fluid between at least one second inlet aperture and at least one second outlet aperture, wherein the outlet aperture of the channel is adjacent the second inlet aperture of the second channel.

12. The airfoil cooling arrangement of claim 1, wherein the primary portion extends longitudinally in a direction and at least a portion of each of the secondary portions extends longitudinally in the direction.

13. The airfoil cooling arrangement of claim 1, wherein some of the multiple of secondary portions are configured to communicate a fluid to a common outlet.

14. An airfoil core mold insert, comprising:
an insert that establishes a cooling channel within an airfoil wall during molding of the airfoil wall, the insert having at least one first end and at least one second end, each at least one first end configured to establish an inlet apertures, each at least one second end configured to establish an outlet aperture, wherein the channel comprises a multiple of secondary portions branching from a primary portion, each of the multiple of secondary portions extending along a non-linear path, and wherein each of the secondary portions has a smaller cross-sectional area than the primary portion of the channel.

15. The airfoil core mold insert of claim 14, wherein the insert comprises a refractory metal.

16. The airfoil core mold insert of claim 14, wherein the total cross-sectional area of the multiple of secondary portions is approximately the same as the cross-sectional area of the primary portion.

17. The airfoil core mold insert of claim 14, wherein a wire electric discharge machine forms the insert from one or more sheets of material.

18. The airfoil core mold insert of claim 14, wherein the airfoil is cast around portions of the insert.

19. The airfoil core mold insert of claim 14, wherein the at least one first end or the at least one second end is configured to adhesively secure to a ceramic core.

20. The airfoil core mold insert of claim 14, wherein at least some of the multiple of secondary portions are aligned with the primary portion.

21. The airfoil core mold insert of claim 14, wherein the insert comprises a plurality of sheets of material.

22. The airfoil core mold insert of claim 14, wherein the channel has a quadrilateral shaped cross-section.

23. The airfoil core mold insert of claim 14, wherein more than one second end are configured to together establish the outlet aperture.

24. An airfoil cooling method, comprising:
receiving a flow of fluid from a airfoil core cavity; and
communicating the flow of fluid through a channel within a wall of the airfoil, the channel having a secondary portion branching from a primary portion, the secondary portion extending along a non-linear path, and wherein each of the secondary portions has a smaller cross-sectional area than the primary portion of the channel.

25. The airfoil cooling method of claim 24, wherein the channel extends between an inlet aperture and an exit aperture, the inlet aperture adjacent the airfoil core cavity.

26. The airfoil cooling method of claim 24, communicating the flow of fluid through the secondary portion and the primary portion in the same direction.

27. The airfoil cooling method of claim 24, including more than one of the secondary portion branching from the primary portion and terminating at a common exit aperture.

* * * * *